US006801717B1

(12) United States Patent
Hofer

(10) Patent No.: US 6,801,717 B1
(45) Date of Patent: Oct. 5, 2004

(54) METHOD AND APPARATUS FOR CONTROLLING THE DEPTH OF FIELD USING MULTIPLE USER INTERFACE MARKERS

(75) Inventor: Gregory V. Hofer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/406,767
(22) Filed: Apr. 2, 2003
(51) Int. Cl.[7] .......................... G03B 13/34; G03B 13/30
(52) U.S. Cl. ........................ 396/121; 396/147; 396/287
(58) Field of Search ................................. 396/121, 130, 396/147, 287, 288

(56) References Cited

U.S. PATENT DOCUMENTS

| | | | |
|---|---|---|---|
| 4,982,217 A | * | 1/1991 | Aihara ........................ 396/121 |
| 5,103,254 A | * | 4/1992 | Bell et al. .................... 396/147 |
| 5,187,585 A | | 2/1993 | Kaneda et al. |
| 5,412,487 A | | 5/1995 | Nishimura et al. |
| 5,473,369 A | | 12/1995 | Abe |
| 5,526,049 A | | 6/1996 | Lee |
| 5,532,782 A | * | 7/1996 | Mori et al. .................... 396/89 |
| 5,552,823 A | | 9/1996 | Kageyama |
| 5,610,653 A | | 3/1997 | Abecassis |
| 5,739,857 A | | 4/1998 | Kaneda |
| 5,740,477 A | | 4/1998 | Kosako et al. |
| 5,745,175 A | | 4/1998 | Anderson |
| 6,081,670 A | | 6/2000 | Madsen et al. |

* cited by examiner

Primary Examiner—David Gray
Assistant Examiner—Arthur A Smith
(74) Attorney, Agent, or Firm—Steven L. Webb

(57) ABSTRACT

A digital imaging device that allows the user to mark multiple objects with UI markers is disclosed. The digital imaging device automatically adjusts the focus and aperture to include the marked objects in the depth of field of the digital imaging device.

22 Claims, 3 Drawing Sheets

METHOD AND APPARATUS FOR CONTROLLING THE DEPTH OF FIELD USING MULTIPLE USER INTERFACE MARKERS

FIELD OF THE INVENTION

The field of this invention relates to digital cameras and more specifically to a digital camera that allows a user to control the depth of field by setting multiple user interface (UI) markers.

BACKGROUND OF THE INVENTION

Digital imaging devices typically have many automatic settings. For example, many digital cameras automatically set the focus, the aperture, and the exposure time. Some digital cameras allow the user to override or assist the automatic setting. For example, some digital cameras allow the user to set the area in the image that will be used by the camera to determine the focus. One way this is done is by centering the area in the viewfinder and pressing the shutter button halfway down. Once the camera has focused, the user re-frames the shot and presses the shutter button the rest of the way down. Other cameras allow the user to mark an object to be used as the focus area, for example see U.S. Pat. No. 5,187,585 "Image sensing apparatus with settable focus detection area" which is hereby included by reference. Yet other cameras divide the viewfinder into regions or zones and allow the users to designate one or more zones as the area used to determine focus.

Some digital cameras also allow the user to set the aperture of the camera. This allows the user some control over the depth of field and works well when only one object is in the scene. When the user wishes to make sure two objects, that are different distances from the camera, are in focus at the same time, the user must try to set the focus point between the two objects and adjust the depth of field to include the two objects. Some cameras allow the user to focus on a first object, refocus on a second object, and the camera will adjust the focus between the two objects and adjust the depth of field to include the two objects (see the Canon EOS Rebel S camera). Unfortunately the user must remember which objects were selected.

Therefore there is a need for a digital imaging device that offers an easier way to adjust the depth of field in the image.

SUMMARY OF THE INVENTION

A digital imaging device that allows the user to mark multiple objects with UI markers is disclosed. The digital imaging device automatically adjusts the focus and aperture to include the marked objects in the depth of field of the digital imaging device.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
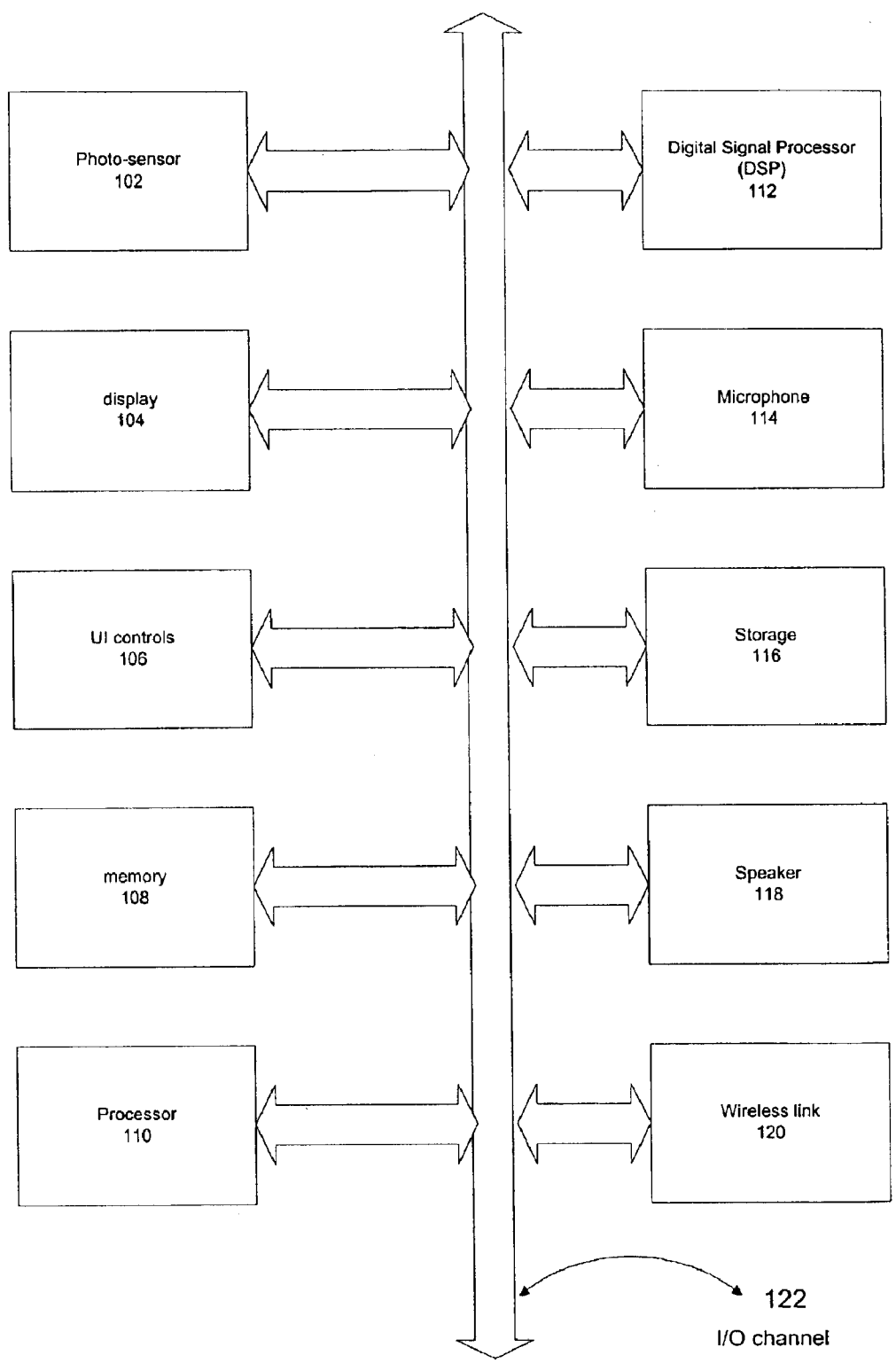
FIG. 1 is a block diagram of a digital imaging system in accordance with an example embodiment of the present invention.
Figure 2:
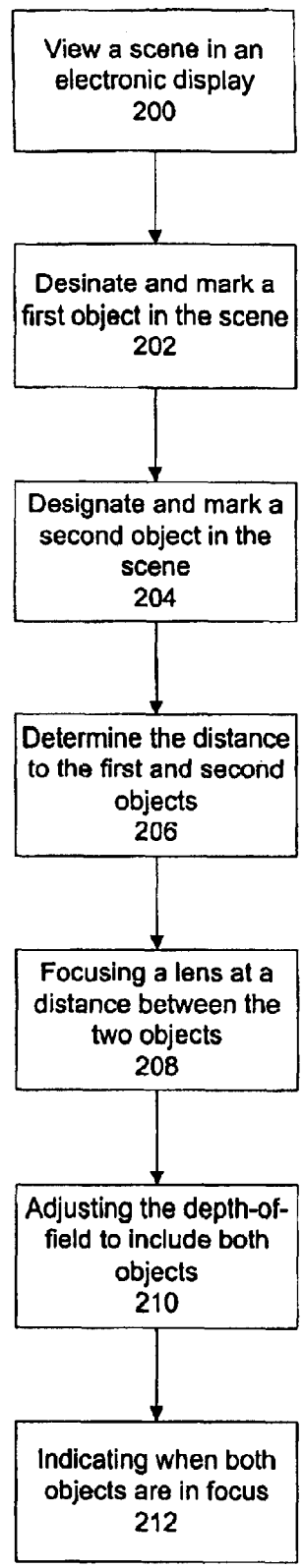
FIG. 2 is a flow chart for adjusting the depth of field to include two objects in accordance with an example embodiment of the present invention.

An electronic block diagram of a typical digital imaging device is shown in FIG. 1. Digital cameras today typically contain a photo-sensor (102) for capturing images; a display area (104) for displaying the captured images and controlling the digital camera; a storage area (116) for storing the captured images; memory (108), for temporary manipulation of the captured images and for running the firmware of the camera; a processor (110) for controlling the camera, and some type of user interface (UI) controls (106). Some digital cameras also include a microphone (114) for capturing audio clips along with the digital images. Some digital cameras include a speaker (118) and a digital signal processor (DSP 112). The UI controls (106) on digital cameras may include physical controls like buttons, rocker switches, a keyboard, and virtual controls shown in the display area. The digital images, video clips and audio clips captured by the digital camera may be stored in memory (108) or may be moved to the storage area (116). Today the memory and the storage area are typically different types of devices. The memory is typically fast volatile memory and the storage area is typically slower non-volatile memory. In the fixture, as the speed of non-volatile memory increases, all the memory may be of the non-volatile type. Digital imaging devices typically have an input/output (I/O) channel (122). This I/O channel may be, for example, a USB bus, a SCSI bus, an IR link, Fire Wire, or a parallel link. The I/O channel is used to connect the digital imaging device to other computer systems or networks. Some digital imaging devices connect to other computer systems using a camera dock. Digital cameras may also contain a wireless link (120) to the Internet, for example a cell phone.

Some digital cameras have more than one display area, for example a camera may have an LCD display on the back of the camera and have a micro display used as a viewfinder. Both the LCD and the micro display can be used to display a real time view of the scene viewed by the camera. This also allows the camera to display additional information in the displays as the user frames the picture. One type of information that may be displayed is a marker to show where, in the field of view, the camera is focusing. Some cameras allow the user to set or pick an object to use for focusing, for example see U.S. Pat. No. 5,187,585 "Image sensing apparatus with settable focus detection area". In the 585 patent, an object can be designated, and the camera will use that object as the area to focus on, even if the object is moving. There are a number of well known methods to designate an object. One way is to center the object in the viewfinder and then activate a UI control. Some cameras use the S1 position of the shutter button as the UI control (Typically, the S1 position is when the shutter button has been pressed half way down). Other cameras have UI controls that are different than the shutter button.

Once an object has been designated, some cameras mark that object in the display area. There are many types of markers that can be used, for example square brackets can be shown surrounding the designated object. When the camera is moved to reframe the scene, the marker stays centered on the designated object. In this way, the designated object is tracked as its position shifts in the field of view. When an object has been designated and marked, the user can easily keep track of the focus area of the camera.

In some cases the user wishes to make sure two different areas or objects in the scene are in focus at the same time. When the two areas of the scene are at different distances from the camera, the camera must focus between the two objects and adjust the depth of field to include both objects. For a given focal length, the depth of field is determined by a relationship between the distance to the object and the current aperture of the lens. As the aperture size is reduced, the depth of field increases. The camera can use its current focus distance and its current aperture size to determine when two designated objects are in focus.

Some cameras today allow the user to designate two objects, and the camera will focus between them and try to adjust the depth of field to include both objects. However, the camera does not mark the objects in the viewfinder or display area, so it is difficult for the user to make sure that the objects they want are the objects included in the depth of field.

In one example embodiment of the current invention, a scene would be viewed in an electronic display (200). The user would designate a first object in the scene. The camera would mark the object with a UI marker (202). Once an object has been designated and marked, the camera would track the position of that object. The user would designate a second object and the camera would mark the second object with a UI marker (204). The camera would determine the distance to each object (206). The distance may be determined when each object is first designated or the distance may be determined after both objects have been designated. Once two objects have been marked, the camera will focus the lens at a distance between the two objects (208) and adjust the depth of field to try to include both objects (210). The camera will determine when both objects are in focus and indicate this condition to the user (212).

Figure 3:
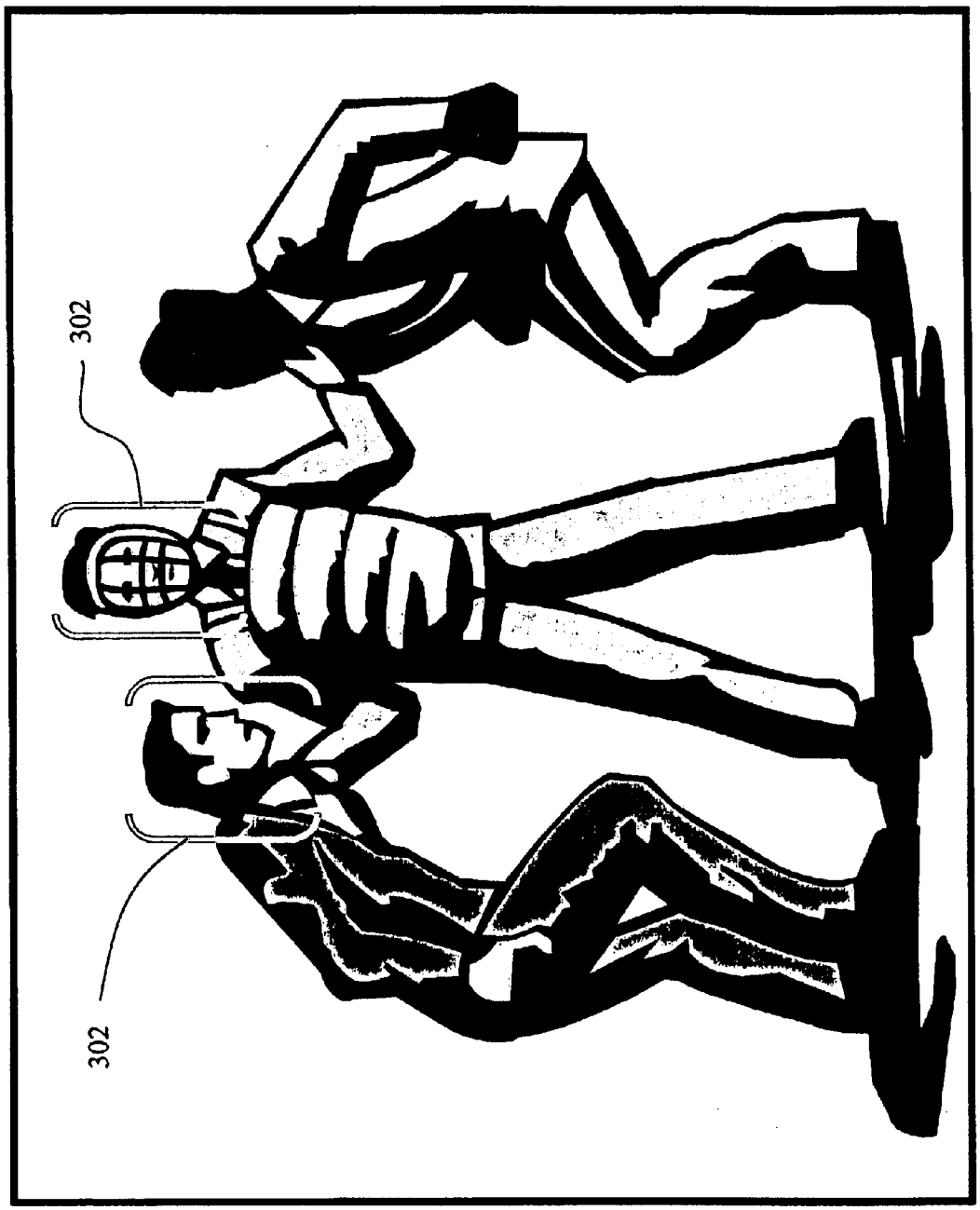
FIG. 3 is a diagram showing one example embodiment for the UI markers used to mark objects in a scene in accordance with an example embodiment of the present invention.

FIG. 3 shows an example embodiment for UI markers (302) marking two objects in a scene.

In one example embodiment the camera will indicate when both objects are in focus by using an indicator displayed in the electronic display, for example a light turning green. In the preferred embodiment, when both objects are in focus the camera will change the color of both UI markers surrounding the two designated objects. For example, when the user designates the first object, the UI marker would be one color (for example black), after the second object has been designated and marked, both UI markers would change to a second color (for example green) when both objects where included in the depth of field. If one or both objects are not in focus, the UI marker may change to another color. For example if one object is in focus but the second object in not quite in focus, one marker may be green and the second marker may be yellow. In one example embodiment of the current invention, the color of the UI markers would indicate how close to focus the two designated objects were. For example, when both objects where not close to focus, the UI markers could be red, when the two objects were close to being in focus, the UI markers could be yellow. And when both designated objects where in focus, the two UI markers could be green. Other methods could be used to indicate the focus condition of the two objects, for example the brightness of the UI markers could change as a function of the focus condition of the two designated objects.

In another example embodiment for the current invention, the user would mark two objects in a scene. Then the user would manually change the focus and aperture settings until the UI markers indicated that both objects were included in the depth of field.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various modifications as are suited to the particular use contemplated. It is intended that the appended claims be construed to include other alternative embodiments of the invention except insofar as limited by the prior art.

What is claimed is:

1. A method comprising:

displaying a scene on an electronic display;

reading user input identifying a first object in a field of view in an imaging device;

marking the first object in the scene with a first UI marker;

tracking the first object in the field of view as the imagine device is moved so that the first UI marker remains on the first object;

focusing a lens on the first object;

reading user input identifying a second object in a field of view in an imaging device;

marking the second object in the scene with a second UI marker;

tracking the second object in the field of view as the imaging device is moved so that the first UI marker remains on the first object;

focusing the lens on the second object;

focusing the lens at a distance between the first and second objects;

adjusting an aperture setting to adjust a depth of field to include both objects in the depth of field.

2. The method of claim 1 further comprising:

indicating when both objects are in focus.

3. The method of claim 1 where the lens is automatically focused between the two objects.

4. The method of claim 1 further comprising:

changing the color of the UI markers to indicate the focus condition of the two marked objects.

5. The method of claim 1 further comprising:

changing the brightness of the UI markers to indicate the focus condition of the two marked objects.

6. The method of claim 1 where the UI markers are displayed as a set of square brackets that enclose the designated objects.

7. The method of claim 1 where the objects are designated to be marked by centering the objects in the display, and then activating a UI control.

8. The method of claim 1 where the first object and the second object are different areas of a single object.

9. The method of claim 1 where the electronic display is a view finder in a camera.

10. The method of claim 1 where the electronic display is located on the back of a camera.

11. A digital imaging device, comprising:

an image sensor;

a lens configured to focus a scene onto the image sensor;

an aperture that can adjust the amount of light allowed through the lens;

an electronic display configured to display the scene focused onto the image sensor; at least one UI control configured to allow user input into the digital imaging device;

a processor configured to monitor the at least, one UI control;

the processor configured to receive a user identification from the at least one UI control identifying a first object in the scene;

the processor configured to display a UI marker on the display that identifies the first object;

the processor configured to receive a user identification from the at least one UI control identifying second object in the scene;

the processor configured to display a UI marker on the display that identifies the second object;

the processor configured to track the first and second objects in the scene as the digital imaging device is moved so that the UI markers remain on the first and second objects;

the processor configured to determine the distance to the first and second objects;the the processor configured to focus the lens at a distance between the two objects and to adjust the aperture to cause the field of view to include both objects.

12. The digital imaging device of claim 11 where the processor is also configured to indicate when both objects are included in the depth of field.

13. The digital imaging device of claim 11 where the UI markers are displayed as a set of square brackets that enclose the objects.

14. The digital imaging device of claim 11 where the UI markers are changed to indicate the focus condition of the two marked objects.

15. The digital imaging device of claim 14 where the color of the UI markers are changed to indicate the focus condition of the two marked objects.

16. The digital imaging device of claim 11 where the objects are designated to be marked by centering the objects in the display, and then activating the UI control.

17. The digital imaging device of claim 11 where the display is a viewfinder.

18. The digital imaging device of claim 11 where the display is a display on the back of the digital imaging device.

19. A digital imaging device, comprising:

a means for capturing an image of a scene;

a means for displaying the scene;

a means for obtaining user input designating at least two objects in the scene;

a means for tracking the designated objects;

a means for displaying at least two UI markers that identify the designated objects;

a means for determining the distance to each designated object when two objects have been designated;

a means for including both designated objects in the field of view of the digital imaging device.

20. The digital imaging device of claim 19 where the digital imaging device is also configured to indicate when both objects are included in the depth of field.

21. The digital imaging device of claim 19 where the UI markers are displayed as a set of square brackets that enclose the objects.

22. A method comprising:

displaying a scene on an electronic display;

reading uses input identifying a first object in a field of view in an imaging device;

marking the first object in the scene with a first UI marker;

determining the distance to the first object;

reading user input identifying a first object in a field of view in an imaging device;

marking the second object in the scene with a second UI marker;

determining the distance to the second object;

automatically focusing the lens at a distance between the first and second objects;

adjusting an aperture setting to adjust a depth of field to include both objects in the depth of field.

* * * * *